June 14, 1932.   N. W. ADAMS   1,863,459
DIRECTION INDICATOR
Filed Feb. 6, 1931
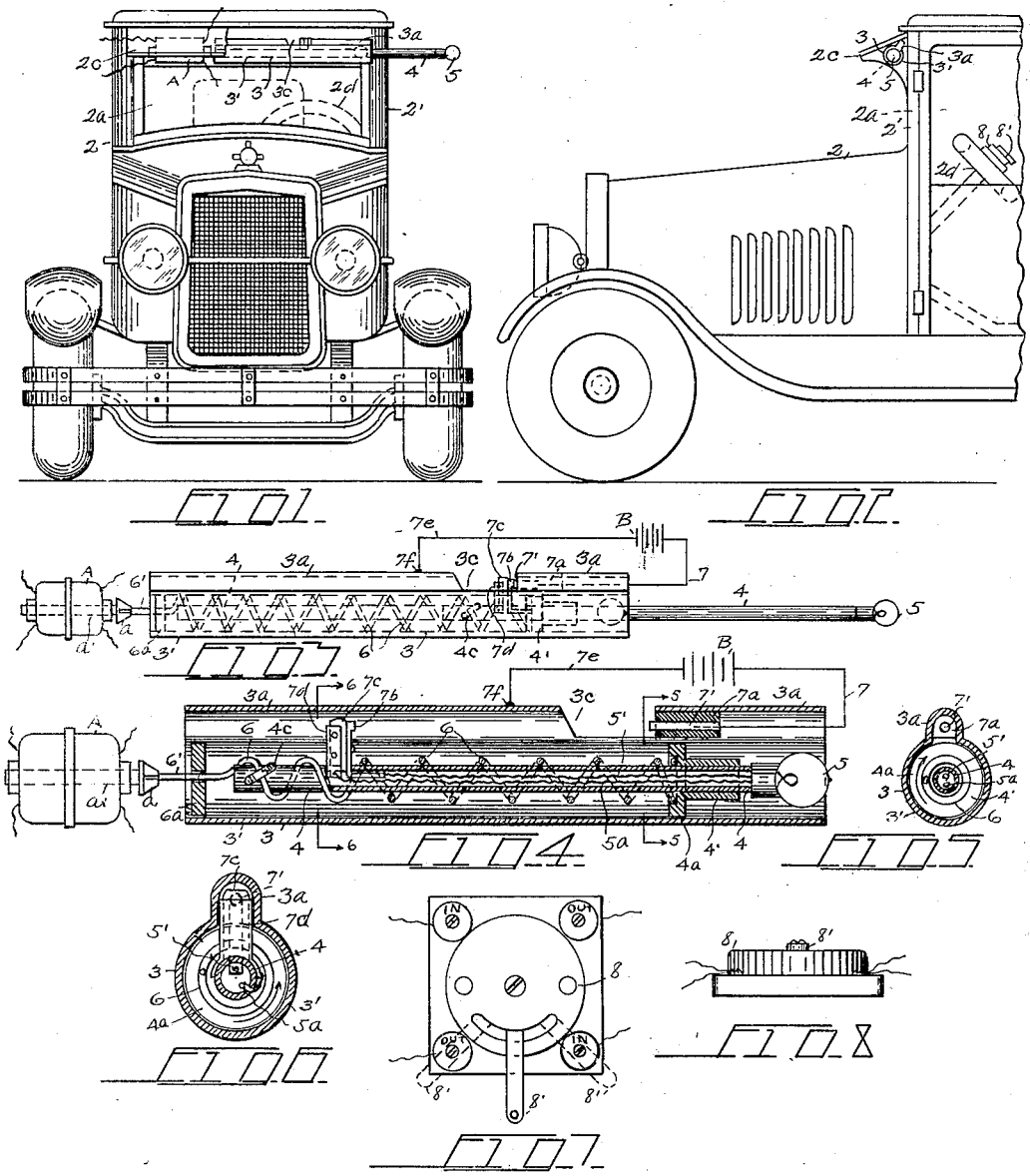
INVENTOR,
Norman W. Adams.
BY
Harry D. Wallace.
ATTORNEY Patented June 14, 1932

1,863,459

UNITED STATES PATENT OFFICE

NORMAN W. ADAMS, OF SYRACUSE, NEW YORK, ASSIGNOR OF FORTY ONE-HUNDREDTHS TO HOMER P. MARSH, OF SYRACUSE, NEW YORK

DIRECTION INDICATOR

Application filed February 6, 1931. Serial No. 513,882.

This invention relates to a direction indicator for motor vehicles, and the like, and has for its object to provide novel electro-mechanical mechanism to indicate turning movements of the vehicle, the said mechanism being power driven, and manually controlled, and being arranged for installation entirely outside of the body of the vehicle. A further object is to provide an indicating mechanism of this class that may be substantially concealed and protected from the weather, by parts common to present day automobile design and construction, thereby obviating defacing or detracting from the ornamental appearances of the vehicle. And a further object is to provide details of construction and arrangement which are extremely simple and highly effective and require a minimum of care and attention on the part of the drivers of the vehicles.

I attain these objects by the means set forth in the detailed description which follows, and as illustrated by the accompanying drawing, in which—

Figure 1 is a front elevation of an automobile, to which my improvement is applied, showing the tubular indicator arm extended to signal approaching and following vehicles. Fig. 2 is a broken side elevation of the automobile. Fig. 3 is a side elevation of the complete device, the signal arm being extended, as in Fig. 1. Fig. 4 is an enlarged central vertical longitudinal section, taken on line 4—4 of Fig. 6, showing the indicator arm in receded position; also showing the motor-driven worm for reciprocating said arm. Fig. 5 is a transverse vertical section taken on line 5—5 of Fig. 4, showing the stationary terminal of the lamp circuit. Fig. 6 is a similar section, taken on line 6—6 of Fig. 4, showing the movable terminal of the lamp circuit carried by the signal arm. Fig. 7 is a top plan view of a suitable switch for starting, stopping and reversing the motor. And Fig. 8 is a side elevation of the same.

In the drawing, 2 represents generally an automobile, 2' the body, 2a the windshield, 2c the water-table or visor that overhangs the windshield, and 2d the usual steering wheel.

My direction indicator comprises an elongated hollow casing or body 3, which is preferably wholly disposed within the angle formed by the top front portion of the body and the visor 2c, in which position the indicator is not only practically invisible, but is also protected from the weather, and may be secured to the body by any suitable means (not shown). By this disposition, no holes need be cut in the body of the car in order to apply or operate the indicator. The lower or main portion 3' of the casing 3 is substantially cylindrical. The top portion of the casing is preferably contracted and comprises an integral hollow rib, as 3a, which is formed with a relatively large opening as 3c, to afford access to the interior intermediate its open ends. 4 represents a tube of relatively small caliber that comprises the reciprocable indicator arm, to one end of which is secured an electric lamp, as 5, that may be supplied with current by wires 5'—5a, which are preferably disposed within the arm, as best shown in Fig. 4. The arm 4 is preferably disposed concentrically in the enlarged chamber 3' of the casing and is partially guided by a sleeve 4', the latter being formed with an annular flange 4a that loosely fits the bore 3' of the casing in which it is rotatable (see Fig. 4). The arm 4 is preferably disposed concentrically in a wire coil or spiral member 6, which is rotated by a motor A, preferably reversible, and for this purpose, one end 6' of the worm is operatively connected with a chuck a carried by the armature shaft a' of the motor, the opposite end of the worm is preferably rigidly connected to the sleeve 4'. The end 6' of the spiral member 6 is preferably journaled in a stationary disc or guide 6a, which is disposed within the barrel 3' of the casing and tends, together with sleeve 4', to maintain the concentricity of the casing, spiral member 6 and arm 4. The spiral member 6 drives the arm 4 in opposite directions by the reversing of the motor, to effect the extension and recession of the signal lamp 5. To this end, the relatively long spiral 6 is loosely connected to the inner end of arm 4, by means of a loop or staple 4c, which is secured to said arm. By this arrangement, rotation of the spiral 6, for example, in the direction of the arrow in Fig. 6, forces the arm 4 towards the right for displaying the signal 5, as in Fig. 3, and the arm may then be returned to the casing 3 by the turning of the spiral in the reverse direction. When operated in either direction, the spiral 6 simply worms its way through the loop 4c and reciprocates the arm 4. The circuit for the lamp 5 comprises a battery B, a wire 7 that leads from one pole of the battery to a stationary terminal 7', which is sheathed in insulation 7a, the latter being permanently disposed in the rib 3a, so as to position the free end of the terminal 7' in the opening 3c of the rib. The wire 5' extends from the lamp 5 within arm 4 and connects with a second terminal 7b which is mounted upon a non-conductor 7c that rises from the arm 4 and plays in the rib 3a. Wire 5a of the lamp circuit passes laterally through the arm 4 and connects with a conducting member or contact shoe 7d, which is also mounted on the insulator 7c. The member 7d and its support 7c extend into the rib 3a, and when arm 4 is reciprocated, conductor 7d makes scraping contact with the inner wall of the rib and completes the lamp circuit whenever arm 4 is extended by means of a wire 7e which connects the opposite pole of the battery B with the rib, as at 7f, shown in Figs. 3 and 4. This renders the operation of lamp 5 entirely automatic. The disposing of the terminal 7b, the members 7c and 7d within the rib, not only guides, but prevents the rotation of arm 4 and renders it possible for the spiral member 6 to reciprocate said arm. The motor A is preferably reversible in order to effect the reciprocation of arm 4 and may be controlled by any suitable reversing switch, as 8, shown in Figs. 7 and 8, which may be operated by a lever 8', shown by full lines in the neutral position. The lefthand dotted position of the handle 8', in Fig. 7, indicates the adjustment of the motor to thrust the signal 5 outwardly, while the righthand dotted position of the handle, in the same view, indicates the inward movement of said arm.

My direction indicator is extremely simple, positive and highly efficient in operation. The provision of the novel spiral drive for the signal arm when coupled with the peculiar guiding means for the said arm that traverses the rib 3a, and the novel automatic control for the lamp circuit, insures prompt, positive and effective means for indicating proposed turning movements of a vehicle.

Having thus described my invention, what I claim is—

Means for actuating vehicle direction indicators, including a tubular body having a longitudinal hollow rib, a member in the cylindrical portion of the body having a part movable in the rib to prevent rotation of the member, an actuating wire coiled around said member to reciprocate same, a loop-like element carried by the member and through which one end of the coiled wire loosely extends, a stationary guide at one end of the tubular body in which said end of the coiled wire is journaled, whereby upon rotation of the wire the member will be reciprocated, a guiding sleeve receiving the opposite end of the member therethrough and having a flange which loosely and rotatably engages the interior of the body, means to fixedly secure the opposite end of the coiled wire to the sleeve, and means to drive the coiled wire.

In testimony whereof I affix my signature.

NORMAN W. ADAMS.